US008846805B2

(12) United States Patent
Kniesel et al.

(10) Patent No.: US 8,846,805 B2
(45) Date of Patent: Sep. 30, 2014

(54) THERMOPLASTIC POLYOLEFIN COMPOUNDS WITH DECREASED FLAMING SENSITIVITY

(75) Inventors: Claudia Kniesel, Leonding (AT); Erich Seitl, Leonding (AT); Rudolf Wölfer, Linz (AT)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 13/138,970

(22) PCT Filed: May 5, 2010

(86) PCT No.: PCT/EP2010/056069
§ 371 (c)(1),
(2), (4) Date: Dec. 12, 2011

(87) PCT Pub. No.: WO2010/128065
PCT Pub. Date: Nov. 11, 2010

(65) Prior Publication Data
US 2012/0077919 A1    Mar. 29, 2012

(30) Foreign Application Priority Data
May 7, 2009   (EP) .................................. 09159603

(51) Int. Cl.
| C08L 23/20 | (2006.01) |
| C08L 23/16 | (2006.01) |
| C08K 3/26 | (2006.01) |
| C08K 3/34 | (2006.01) |
| C08L 23/10 | (2006.01) |
| C08L 23/00 | (2006.01) |
| C08L 23/08 | (2006.01) |

(52) U.S. Cl.
CPC .............. *C08L 23/00* (2013.01); *C08L 2205/02* (2013.01); *C08L 23/0815* (2013.01); *C08L 23/16* (2013.01); *C08L 23/10* (2013.01)
USPC ........... 524/528; 524/427; 524/449; 524/451; 524/456; 524/525

(58) Field of Classification Search
CPC ......... C08L 23/10; C08L 23/20; C08L 23/16; C08K 3/26; C08K 3/34
USPC ........................... 524/427, 449, 451, 456, 525
See application file for complete search history.

(56) References Cited

U.S. PATENT DOCUMENTS

| 3,940,379 A | 2/1976 | Castagna et al. |
| 4,282,076 A | 8/1981 | Boynton |
| 4,951,589 A | 8/1990 | Pfeffer |
| 5,250,631 A | 10/1993 | McCullough, Jr. |

FOREIGN PATENT DOCUMENTS

| CN | 1957035 A | 5/2007 |
| EP | 0320150 A1 | 6/1989 |
| EP | 0462574 A1 | 12/1991 |
| EP | 0480190 A2 | 4/1992 |
| EP | 0622380 A1 | 11/1994 |
| EP | 1236769 A1 * | 9/2002 |
| EP | 1303547 A1 | 4/2003 |
| EP | 1477525 A1 * | 11/2004 |
| EP | 1538167 A1 | 6/2005 |
| EP | 1702956 A2 | 9/2006 |
| EP | 1783145 A1 | 5/2007 |
| WO | 9924479 A1 | 5/1999 |
| WO | 02096986 A2 | 12/2002 |
| WO | 2004026957 A1 | 4/2004 |
| WO | 2004113438 A1 | 12/2004 |
| WO | WO 2004113438 A1 * | 12/2004 |
| WO | 2005118712 A1 | 12/2005 |
| WO | 2005123827 A1 | 12/2005 |
| WO | 2007140019 A1 | 12/2007 |

OTHER PUBLICATIONS

L. Westermnan, "The Molecular Weight Distribution in Polypropylene", J. Polym. Sci.: Pt. A, vol. 1, pp. 411-423 (1963).*
L. Westermnan, "The Molecular Weight Distribution in Polypropylene", J. Polym. Sci.: Pt. A, vol. 1, pp. 411-423 (1963).*
International Search Report for Application No. PCT/EP2010/056069 Filed on Jun. 29, 2010.

* cited by examiner

*Primary Examiner* — Ling Choi
*Assistant Examiner* — Ronald Grinsted
(74) *Attorney, Agent, or Firm* — Warn Partners, P.C.

(57) ABSTRACT

Thermoplastic polyolefin compounds for the production of injection molded, paintable and flame pre-treatable articles comprising A) 50 wt % to 90 wt % of a propylene homo- or copolymer matrix phase (M) and B) 10 wt % to 50 wt % of a first elastomer comprising an ethylene-$C_3$-$C_6$-alpha olefin copolymer rubber C) 0 wt % to 20 wt %, based on the total weight of A and B, of a second elastomer, component B) and C) forming a disperse phase (E) and D) >30 wt % up to 60 wt %, based on the total weight of components A, B and C, of an inorganic filler, if the intrinsic viscosity of the disperse phase (E) is <2.2 dl/g according to ISO 1628 (with decalin as solvent) or 0 wt % to <30 wt % based on the total weight of components A, B and C, of an inorganic filler, if the intrinsic viscosity of the disperse phase (E) is ≥2.2 dl/g according to ISO 1628 (with decalin as solvent).

10 Claims, No Drawings

THERMOPLASTIC POLYOLEFIN COMPOUNDS WITH DECREASED FLAMING SENSITIVITY

This application is a National Stage of International Application No. PCT/EP2010/056069, filed May 5, 2010. This application claims priority to European Patent Application No. 09159603.1, filed on May 7, 2009. The disclosures of the above applications are incorporated herein by reference.

This invention is related to thermoplastic polyolefin (TPO) compounds having decreased flaming sensitivity.

The invention is further directed to the use of TPO compounds having decreased flaming sensitivity for the preparation of injection moulded, paintable and flame pre-treatable articles, especially for automotive applications.

STATE OF THE ART

Thermoplastic polyolefins (TPOs), which typically comprise polypropylene and an elastomer, have many desirable properties, e.g. lightweight, durability, low costs, etc. that make them an attractive material of construction for many interior and exterior automotive parts, such as for bumpers.

There are two types of TPOs which essentially differ in their method of preparation. The first, which is commonly referred to as "compound grade TPO", is made by physically blending polypropylene with elastomer. The second, which is commonly referred to as "reactor grade TPO" is made by first polymerizing propylene to polypropylene and then polymerizing elastomer components, such as ethylene and propylene, in the presence of the polypropylene.

Automotive parts, such as bumpers are typically formed by injection-moulding such TPOs. The parts so formed usually have a grey or black appearance and may be used for automobiles without further treatment.

However, many of the automotive parts manufactured from TPOs are painted to improve the aesthetic quality of the automotive part. For instance, automobile bumpers formed from TPOs are often painted to match the colour of the rest of the automobiles' exterior paint. Due to the initially poor adhesion properties of TPOs, which are typically low surface energy materials, the surface of the TPOs is pre-treated before colour/clear coats are applied in order to improve adhesion.

Flame treatment is a well established method for the surface treatment to improve adhesion of paints. Flame treatment involves the brief application of a flame to the polymer surface, which leads to an increase in surface tension, but requires a precise distance of the flame to the surface of the TPO that is difficult to achieve on a production line.

As experience has shown, several TPOs do not produce good results with flame treatment due to their high flaming sensitivity if the distance of the flame is too close. This high flaming sensitivity leads to surface defects due to melting of the edges of the injection moulded part, occurrence of bubbles at the edges and degradation.

These effects are even more visible in the form of massive local whitening after applying a clear coat paint layer on the injection moulded parts.

Although a great variety of TPOs has already been disclosed in the literature, the problem of flaming sensitivity has not yet been solved in a manner sufficient to satisfy the current demand in the automotive industry.

Accordingly a need exists in the art for thermoplastic polyolefins compounds that overcome such shortcomings.

It was therefore an object of the invention to provide thermoplastic polyolefin compounds, which are suitable for producing injection moulded paintable articles and show decreased or even no flaming sensitivity during pre-treatment by flaming before applying colour/clear coats to these articles.

This object was achieved by thermoplastic polyolefin compounds comprising either a combination of high molecular weight elastomer with an intrinsic viscosity equal to or above 2.2 dl/g according to ISO 1628 (with decalin as solvent) and a low filler content or of a lower molecular weight elastomer with an intrinsic viscosity below 2.2 dl/g according to ISO 1628 (with decalin as solvent) and a higher filler content.

Thus in a first aspect the present invention is directed to thermoplastic polyolefin compounds for the production of injection moulded, paintable and flame pre-treatable articles comprising A) 50 wt % to 90 wt % of a propylene homo- or copolymer matrix phase (M) and
B) 10 wt % to 50 wt % of a first elastomer comprising an ethylene-$C_3$-$C_8$-alpha olefin copolymer rubber and
C) 0 wt % to 20 wt %, based on the total weight of A and B, of a second elastomer, component B) and C) forming a disperse phase (E) with an intrinsic viscosity of ≥2.2 dl/g according to ISO 1628 (with decalin as solvent) and
D) 0 wt % to ≥30 wt % based on the total weight of components A, B and C, of an inorganic filler.

In a second aspect the present invention is directed to thermoplastic polyolefin compounds for the production of injection moulded, paintable and flame pre-treatable articles comprising A) 50 wt % to 90 wt % of a propylene homo- or copolymer matrix phase (M) and
B) 10 wt % to 50 wt % of a first elastomer comprising an ethylene-$C_3$-$C_8$-alpha olefin copolymer rubber and
C) 0 wt % to 20 wt %, based on the total weight of A and B, of a second elastomer, component B) and C) forming a disperse phase (E) with an intrinsic viscosity of <2.2 dl/g according to ISO 1628 (with decalin as solvent) and
D) >30 wt % up to 60 wt %, based on the total weight of components A, B and C, of an inorganic filler.

Surprisingly such thermoplastic polyolefins respectively thermoplastic polyolefin compounds show decreased or even no flaming sensitivity during pre-treatment by flaming before applying colour/clear coats in order to increase adhesion properties of the TPO compounds.

The matrix phase (M) of the thermoplastic polyolefins (TPOs) according to the invention must be a polypropylene matrix, which is in the following called propylene matrix (M).

The polypropylene used as the matrix resin can be any polypropylene, in particular polypropylenes suitable for automotive exteriors, like bumpers.

Thus, the polypropylene for the propylene matrix (M) is not particularly restricted and can be a propylene homopolymer, a propylene copolymer or mixtures thereof, like a homo/random copolymer. However it is preferred that the propylene matrix (M) is a propylene homopolymer.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

Where the propylene matrix (M) comprises a propylene copolymer or is a homo/random propylene copolymer, the propylene copolymer comprises monomers copolymerizable with propylene, for example comonomers such as ethylene and $C_4$ to $C_{20}$ alpha-olefins, in particular ethylene and $C_4$ to $C_{10}$ alpha-olefins, e.g. 1-butene or 1-hexene. The comonomer content in the propylene matrix is in such a case preferably relatively low, i.e. up to 4.0 wt %, more preferably 0.1 to 3.0 wt %, still more preferably 0.2 to 2.0 wt %, yet more preferably 0.3 to 1.0 wt %. Higher amounts of comonomer can be used also, but the comonomer should be present in an amount of not more than about 20 wt %, preferably not more than about 15 wt %, even more preferably not more than about 10 wt %.

The polypropylene of the matrix resin may have a melt flow rate (MFR$_2$ measured under a load of 2.16 kg at 230° C. according to ISO 1133) of from about 20 to about 500 g/10 min. Preferably the propylene matrix (M) has an MFR$_2$ equal to or above 40 g/10 min to about 200 g/10 min.

The propylene matrix (M) can be unimodal or multimodal, like bimodal. However it is preferred that the propylene matrix (M) is unimodal.

When the matrix is unimodal with respect to the molecular weight distribution, it may be prepared in a single stage process e.g. a slurry or gas phase process in a slurry or gas phase reactor. Preferably, the unimodal matrix is polymerized as a slurry polymerization. Alternatively, the unimodal matrix may be produced in a multistage process using at each stage process conditions which result in similar polymer properties.

Where the propylene matrix (M) comprises two or more different propylene polymers these may be polymers with different monomer make up and/or with different molecular weight distributions. These components may have identical or differing monomer compositions and tacticities.

The propylene matrix (M) may therefore be prepared by various processes, for example, in a single stage or multiple stages, by such polymerization methods as slurry polymerization, gas phase polymerization, bulk polymerization, solution polymerization or a combination therefrom.

Preparation of the matrix phase (M) may also include the use of a catalyst known to those of skill in the art, such as a metallocene catalyst or a Ziegler-Natta catalyst.

The matrix phase (M) is present in an amount of 50 to 90 wt %, preferably 60 to 85 wt % and more preferably 65 to 80 wt %, based on the total amount of the TPO.

The TPOs used according to the invention further comprise a disperse phase (E), which is formed by component B) and C).

In the context of the invention the terms "rubber" and "elastomer" are used synonymously.

The propylene matrix (M) and component B) as disperse phase form a base TPO.

Component B) of the base TPO is an ethylene-C$_3$-C$_8$ alpha olefin copolymer rubber. The ethylene-C$_3$-C$_8$ alpha olefin copolymer rubber B) constitutes 10 to 50 wt %, preferably 15 to 40 wt % and more preferably 20 to 35 wt % of the TPO.

The ethylene-C$_3$-C$_8$ alpha olefin copolymer rubbers B) generally contain between 10 to 95 wt % ethylene, preferably 20 to 80 wt % ethylene and more preferably 40 to 70 wt % ethylene and 5 to 90, preferably 20 to 80 wt % and more preferably 30 to 60 wt % of at least one alpha-olefin comonomer having 3 to 8 C-atoms.

Preferably the comonomers are selected from the group consisting of propylene, 1-butene, 1-hexene, 4-methyl-1-pentane and 1-octene. More preferably propylene or 1-octene is used as comonomer for component B) of the TPO.

The disperse phase (E) may further comprise 0 to 20 wt %, preferably 2 to 10 wt % based on the total weight of A and B, of a second elastomer (Component C).

Component C) may be different from the first elastomer or can be the same elastomer as component B).

Examples of suitable elastomers (C) therefore include ethylene/alpha-olefin random copolymer, ethylene/alpha-olefin/non-conjugated polyene random copolymer, a hydrogenated block copolymer and other elastic polymers or mixtures thereof.

Preferred elastomers used as component C) are ethylene/alpha-olefin random copolymers, which comprise ethylene and up to 45 wt % of one or more C$_3$ to C$_8$ alpha-olefins.

More preferably elastomeric ethylene-1-octene or ethylene-1-butene copolymers are used as second elastomer.

Preferably component C) is different from component B).

Like the propylene matrix (M) the rubber B) and C) can be unimodal or multimodal, like bimodal.

The expressions "multimodal" or "bimodal" or "unimodal" used herein refers to the modality of the polymer, i.e. the form of its molecular weight distribution curve, which is the graph of the molecular weight fraction as a function of its molecular weight.

Rubbers suitable as component B) and component C) may be prepared using titanium, vanadium or metallocene based catalysts capable of readily polymerizing rubbers under typical process conditions by known polymerization processes such as solution, suspension and gas-phase polymerization.

The manner in which base TPOs comprising the propylene matrix (M) and component B) as disperse phase (E) are produced is not critical to the present invention. They can be produced by conventional melt blending of the individual components, i.e. propylene matrix (M) and elastomer B), by "reactor blending", by combinations of these two processes or other means which achieve good dispersion of the rubber component B) in the propylene matrix (M).

Preferably the base TPOs are produced by "reactor blending" by a multistage polymerization process such as bulk polymerization, gas phase polymerization, slurry polymerization, solution polymerization or combinations thereof using conventional catalysts.

Those processes are well known to one skilled in the art.

A preferred process is a combination of bulk slurry loop reactor(s) and gas phase reactor(s). The propylene matrix (M) can be made either in one or two loop reactors or in a combination of loop and gas phase reactor. The polymer produced in this way is transferred into another reactor and the disperse phase comprising the ethylene-C$_3$-C$_8$ alpha olefin copolymer rubber B), is polymerized. Preferably this step is done in a gas phase polymerization.

A suitable catalyst for the polymerization of the base TPO is any stereospecific catalyst for propylene polymerization which is capable of polymerizing and copolymerizing propylene and comonomers at a temperature of 40 to 110° C. and at a pressure from 10 to 100 bar. Ziegler-Natta as well as metallocene catalysts are suitable catalysts.

One skilled in the art is aware of the various possibilities to produce such base TPOs and will simply find out a suitable procedure to produce suitable base TPOs which are used in the present invention.

The base TPO obtained either by conventional melt blending or by "reactor blending", may then be further blended with the second elastomer C), which then forms part of the disperse phase (E).

Preferably, elastomer C) is mixed into the base TPO prior to or during the extrusion process in a one-step compounding process.

For mixing, a conventional compounding or blending apparatus, e.g. a Banbury mixer, a 2-roll rubber mill, Buss-co-kneader or a twin screw extruder may be used.

Depending on the intrinsic viscosity of the disperse phase (E) comprising the first elastomer B) and optionally the second elastomer C), the TPO is further blended with different amounts of an inorganic filler D)

If the intrinsic viscosity of the disperse phase (E) is <2.2 dl/g according to ISO 1628 (with decalin as solvent), then >30 wt % up to 60 wt %, based on the total weight of components A, B and C, of an inorganic filler is added.

If the intrinsic viscosity of the disperse phase (E) is ≥2.2 dl/g according to ISO 1628 (with decalin as solvent) 0 wt % to ≥30 wt % based on the total weight of components A, B and C, of an inorganic filler is added.

If desired, also higher amounts up to 60 wt % based on the total weight of components A, B and C of inorganic filler may be added for these conditions.

The inorganic filler, when present, is selected from talc, wollastonite, mica and chalk.

The mean particle size d50 of the filler may be chosen between 0.5 to 40 μm, preferably between 0.7 to 20 μm and more preferably between 1.0 to 10 μm.

The mean (or median) particle size is the particle diameter where 50% of the particles are larger and 50% are smaller. It is denoted as the d50 or $D_{50}$.

In principle, this value may be determined by any particle measuring techniques, for example measuring techniques based on the principle of light diffraction.

Other techniques for determining particle sizes include, for example, granulometry in which a uniform suspension of a small quantity of the powder to be investigated is prepared in a suitable dispersion medium and is then exposed to sedimentation. The percentage distribution of the particle sizes can be estimated from the correlation between size and density of the spherical particles and their sedimentation rate as determined by Stokes law and the sedimentation time. Other methods for determining particle size include microscopy, electron microscopy, sieve analysis, sedimentation analysis, determination of the surface density and the like.

The particle size data appearing in the present specification were obtained in a well known manner with a standard test procedure employing Stokes' Law of Sedimentation by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; website: www.micromeritics.com), referred to herein as a "Micromeritics Sedigraph 5100 unit".

Preferably talc is used as inorganic filler.

Before the talc is added it may be treated with various surface treatment agents, such as organic titanate coupling agents, silane coupling agents, fatty acids, metal salts of fatty acids, fatty acid esters, and the like, in a manner known in the state of the art. The talc may also be added without surface treatment.

Preferably the talc is added without surface treatment.

Preferably TPO compounds with an intrinsic viscosity of the disperse phase (E) ≥2.5 dl/g, more preferably ≥2.8 dl/g, even more preferably ≥3.0 dl/g and most preferably ≥3.2 dl/g containing 2 to 10 wt % based on the total weight of components A) and B) of a second elastomer and 10 to 30 wt % based on the total weight of components A, B and C, of an inorganic filler are used according to the invention.

The TPO compounds according to the invention may further comprise an additional polymer. A preferred additional polymer is a high melt flow rate polypropylene homopolymer with an MFR above 50 g/10 min according to ISO 1133 (2.16 kg; 230° C.).

The polymers that can suitably be employed have a melt flow rate (MFR) measured according to ISO 1133 at 230° C. under a load of 2.16 kg of from 50 to 3000 g/10 min, preferably from 100 to 2000 g/10 min, more preferably from 200 to 1500 g/10 min.

The expression homopolymer used in the instant invention relates again to a polypropylene that consists substantially, i.e. of at least 97 wt %, preferably of at least 99 wt %, and most preferably of at least 99.8 wt % of propylene units. In a preferred embodiment only propylene units in the propylene homopolymer are detectable. The comonomer content can be determined with FT infrared spectroscopy, as described below in the examples.

The high melt flow rate polypropylenes optionally added can be produced directly in a polymerization reactor by well known processes, described in several patent applications (for example in EP 0 320 150, EP 0 480 190, EP 0 622 380, EP 1 303 547, EP 1 538 167, EP 1 783 145, WO 2007/140019, etc.).

Alternatively the high melt flow rate polypropylenes optionally added can be obtained by controlled rheology (CR) techniques, including, e.g., visbreaking, which means that a polymer, having low melt flow rate, is subjected to a post-reactor treatment, wherein the polymer molecules are subjected to controlled scission in molten state. The scission may be carried out by mechanical shearing, radiation and oxidation or chemically with peroxy compounds.

Preferably controlled rheology treatments are carried out using organic peroxides. The process of visbreaking a propylene polymer material is well known to those skilled in the art and is described in several patent applications (for example in U.S. Pat. No. 3,940,379, U.S. Pat. No. 4,951,589, U.S. Pat. No. 4,282,076, U.S. Pat. No. 5,250,631, EP 0 462 574, WO 02/096986, WO 2004/113438, etc.).

The polymer used as starting compound for the controlled rheology treatment may be produced by any polymerisation process known in the art.

The polymerisation process may be a continuous process or a batch process utilising known methods and operating in liquid phase, optionally in the presence of an inert diluent, or in gas phase or by mixed liquid-gas techniques. The process is preferably carried out in the presence of a stereospecific catalyst system.

As catalyst any ordinary stereospecific Ziegler-Natta catalysts or any metallocene catalyst capable of catalysing the formation of a propylene polymer can be used.

In addition, examples of commercially available modified polypropylene products that can suitably be employed in the present invention are Borflow™ HL504FB, HL508FB or HL512FB all by Borealis, Metocene MF650 by Basell Polyolefins, Marlex® HGZ-1200 by Phillips Sumika Polypropylene Company, Escorene™ PP3505 and PP3746 all by ExxonMobile, EOD 96-36 and 3960X by Fina, Valtec grades like HH442H, HH441, PF008, PF017, etc. by LyondellBasell etc.

The additional polymer is added in an amount of 0 to 30 wt %, based on the total weight of A and B (baseTPO), preferably 2 to 20 wt % and more preferably 4 to 15 wt %.

The thermoplastic polyolefin compounds according to the present invention may further contain conventional additives known in the art such as nucleating agents, process and heat stabilisers, UV stabilizers, slip agents, antistatic agents, pigments and other colouring agents including carbon black. Depending on the type of additive, these may be added in an amount of 0.001 to 10 wt % based on the weight of the thermoplastic polyolefin compound.

Preferably, the additives, including Components C) and D) are mixed into the base TPO prior to or during the extrusion process in a one-step compounding process. Alternatively, a master batch may be formulated, wherein the base TPO is first mixed with only some of the additives.

For mixing, a conventional compounding or blending apparatus, e.g. a Banbury mixer, a 2-roll rubber mill, Bussco-kneader or a twin screw extruder may be used. The polymer materials recovered from the extruder are usually in the form of pellets. These pellets are then preferably further processed by injection moulding to generate articles and products of the thermoplastic polyolefin compounds according to the present invention.

The thermoplastic polyolefin compounds according to the invention may be pelletized and compounded using any of the variety of compounding and blending methods well known and commonly used in the resin compounding art.

As mentioned above the thermoplastic polyolefin compounds of the present invention are used for the preparation of injection moulded articles for exterior automotive parts, such as bumpers, spoilers, fenders, body panels, side bump strips and the like, which are painted to match the color of the rest of the automobiles' exterior paint.

Since TPOs in general show initially poor adhesion properties, as being low surface energy materials, the surface of the TPOs has to be pre-treated to ensure good adhesion of the paint to the TPO.

Flame treatment is a well established method for the surface treatment to improve adhesion of paints.

Injection moulded articles, prepared by using the thermoplastic polyolefin compounds of the present invention show a decreased or even no flaming sensitivity compared to injection moulded articles, prepared from thermoplastic polyolefin compounds used according to the state of the art, during pre-treatment by flaming before applying colour/clear coats and show furthermore an increased thermal conductivity.

By using the thermoplastic polyolefin compounds of the present invention no surface defects due to melting of the edges of the injection moulded part, occurrence of bubbles at the edges and the like occur during such a flame treatment.

After such pre-treatment the injection moulded articles, prepared by using the thermoplastic polyolefin compounds of the present invention may be painted by any conventional known method with any conventional paint system.

The current invention also provides injection moulded, paintable and flame pre-treatable articles prepared by using the above described TPO compounds.

Surprisingly, it was found that the moulded articles manufactured with the TPO compounds according to the invention display decreased or even no flaming sensitivity during flame pre-treatment and thus improved surface quality.

Methods:

Melt Flow Rate

Unless otherwise specified, the melt flow rate is measured as the $MFR_2$ in accordance with ISO 1133 (230° C., 2.16 kg load) for polypropylene and is indicated in g/10 min. The $MFR_2$ is an indication of the flowability, and hence the processability, of the polymer. The higher the melt flow rate, the lower the viscosity of the polymer.

Comonomer content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$-absorption peak (800-650 $cm^{-1}$) was measured with Perkin Elmer FTIR 1600 spectrometer. The method was calibrated by ethylene content data measured by $^{13}$C-NMR.

Xylene Solubles

The xylene soluble fraction (XS) as defined and described in the present invention was determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume of solvent taken (250 milliliters) and $v_1$ defines the volume of the aliquot taken for determination (analysed sample; 100 milliliters).

XS largely corresponds to the rubber content of the heterophasic polymer.

The intrinsic viscosity (IV) value increases with the molecular weight of a polymer. The IV values were measured according to DIN EN ISO 1628-1 (October 1999) in Decalin at 135° C.

Thermal Conductivity:

The thermal conductivity, λ, in W/mK, was determined on a 15 mm diameter barrel of a Triple Bore Capillary Rheometer, Rheograph 6000 (Göttfert GmbH, Germany), applying the so-called "line-source method", defined under ASTM D 5930-01. The method used a calibrated line-source probe with 0.16 mm length, which was completely imbedded in a specimen that was kept under a constant temperature environment (set temperature). Such procedure was done for a minimum of 20 minutes. During the course of the measurement, a defined amount of heat was produced by the line-source probe, using a high accuracy power supply. Such heat was then propagated radially into the sample. The thermal conductivity was measured applying a constant pressure of 15 bar, that ensures contact between the probe and the sample. A sample amount of 25 $cm^3$ was used for each test. The sample loading was done at 240° C., using 10 doses; after each dosing the material was compressed with a standard piston up to 70 MPa in order to get an air free specimen.

The thermal conductivity as such was calculated using equation 1.

$$\lambda = \frac{C \cdot Q}{4\pi} \frac{\ln\left(\frac{t_2}{t_1}\right)}{(T_2 - T_1)} \tag{1}$$

with,

Q [W/m] specific energy of the thermal conductivity probe

C [–] correction constant of the thermal conductivity probe $t_1$ [s] starting point for the linear dependency of the temperature rise with log time, $t_1$=60 s $t_2$ [s] end point for the linear dependency of the temperature rise with log time, $t_2$=120 s $T_1$ [K] temperature recorded at $t_1$ $T_2$ [K] temperature recorded at $t_2$ λ [W/mK] thermal conductivity The thermal conductivity was measured at two different temperatures: 130 and 200° C.

The coefficient of variation for the thermal conductivity method described above is ±2.2%, with a level of 95% confidence.

EXAMPLES

The following compositions have been prepared:

Base TPO I)

Base TPO I) was produced with the Spheripol® process from LyondellBasell in a plant having a prepolymerization reactor, two loop reactors and two gas phase reactors connected in series.

The monomodal propylene homopolymer matrix was produced in the two loops; the disperse phase consisting of an ethylene-propylene rubber was produced in the two gas phase reactors.

The catalyst used in the polymerization was the ZN104 catalyst commercially available from LyondellBasell, the cocatalyst was Triethylaluminium (TEA) and as an external donor dicyclopentyl dimethoxy silane was used.

The ethylene-propylene rubber produced was a propylene-rich monomodal rubber.

Analytics of Base TPO I)

| | |
|---|---|
| $C_2$ total [wt %] | 15.6 |
| XS [wt %] | 30.2 |
| $C_2$/XS [wt %] | 34.9 |
| IV/XS [dl/g] | 2.15 |
| $MFR_2$ 230° C./2.16 kg [g/10 min] | 12.3 |

Base TPO II)

Base TPO II) was produced with the Spheripol® process from LyondellBasell in a plant having a prepolymerization reactor, two loop reactors and two gas phase reactors connected in series.

The monomodal propylene homopolymer matrix was produced in the two loops; the disperse phase consisting of an ethylene-propylene rubber was produced in the two gas phase reactors.

The catalyst used in the polymerization was the ZN104 catalyst commercially available from Basell, the cocatalyst was Triethylaluminium (TEA) and as an external donor dicyclopentyl dimethoxy silane was used.

The ethylene-propylene rubber produced was a propylene-rich bimodal rubber.

Analytics of Base TPO II)

| | |
|---|---|
| $C_2$ total [wt %] | 16.2 |
| XS [wt %] | 30.3 |
| $C_2$/XS [wt %] | 37.4 |
| IV/XS [dl/g] | 2.93 |
| $MFR_2$ 230° C./2.16 kg [g/10 min] | 12.7 |

Base TPO III)

Base TPO III) was produced with the Spheripol® process from LyondellBasell in a plant having a prepolymerization reactor, two loop reactors and two gas phase reactors connected in series.

The monomodal propylene homopolymer matrix was produced in the two loops; the disperse phase consisting of an ethylene-propylene rubber was produced in the two gas phase reactors.

The catalyst used in the polymerization was the ZN104 catalyst commercially available from Basell, the cocatalyst was Triethylaluminium (TEA) and as an external donor dicyclopentyl dimethoxy silane was used.

The ethylene-propylene rubber produced was a monomodal rubber.

Analytics of Base TPO III)

| | |
|---|---|
| $C_2$ total [wt %] | 17.1 |
| XS [wt %] | 29.7 |
| $C_2$/XS [wt %] | 39.8 |
| IV/XS [dl/g] | 3.37 |
| $MFR_2$ 230° C./2.16 kg [g/10 min] | 7.2 |

Base TPO IV)

A mechanical blend was prepared by mixing 70 wt % of HJ320MO (propylene homopolymer, commercially available from Borealis) as the propylene matrix and 30 wt % of Engage 8100 (ethylene-octene copolymer having a melt index (ASTM D-1238; 190° C./2.16 kg) of 5 g/10 min and a density (ASTM D-702) of 0.87 kg/m³ with 38 wt % of octene comonomer (Dow Method $^{13}C$ NMR/FTIR), commercially available from DuPont Dow Elastomers) with a twin screw extruder ZSK40 from Werner & Pfleiderer.

Analytics of Base TPO IV)

| | |
|---|---|
| $C_2$ total [wt %] | 18.6 |
| XS [wt %] | 30 |
| $C_2$/XS [wt %] | 62 |
| IV/XS [dl/g] | 1.8 |
| $MFR_2$ 230° C./2.16 kg [g/10 min] | 6.0 |

Base TPO V)

A mechanical blend was prepared by mixing 70 wt % of HJ320MO (propylene homopolymer, commercially available from Borealis) as the propylene matrix and 30 wt % of Engage 8200 (ethylene-octene copolymer having a melt index (ASTM D-1238; 190° C./2.16 kg) of 5 g/10 min and a density (ASTM D-792) of 0.87 kg/m³ with 38 wt % of octene comonomer (Dow Method $^{13}C$ NMR/FTIR), commercially available from DuPont Dow Elastomers) with a twin screw extruder ZSK40 from Werner & Pfleiderer.

Analytics of Base TPO V)

| | |
|---|---|
| $C_2$ total [wt %] | 18.6 |
| XS [wt %] | 30 |
| $C_2$/XS [wt %] | 62 |
| IV/XS [dl/g] | 1.5 |
| $MFR_2$ 230° C./2.16 kg [g/10 min] | 20 |

Base TPO VI)

A mechanical blend was prepared by mixing 70 wt % of HJ320MO (propylene homopolymer, commercially available from Borealis) as the propylene matrix and 30 wt % of Engage 8400 (ethylene-octene copolymer having a melt index (ASTM D-1238; 190° C./2.16 kg) of 30 g/10 min and a density (ASTM D-792) of 0.87 kg/m³ with 40 wt % of octene comonomer (Dow Method $^{13}C$ NMR/FTIR), commercially available from DuPont Dow Elastomers) with a twin screw extruder ZSK40 from Werner & Pfleiderer.

Analytics of Base TPO VI)

| | |
|---|---|
| $C_2$ total [wt %] | 18.0 |
| XS [wt %] | 30 |
| $C_2$/XS [wt %] | 60 |
| IV/XS [dl/g] | 0.9 |
| $MFR_2$ 230° C./2.16 kg [g/10 min] | 30 |

Base TPO VII)

Base TPO G) was produced with the Borstar® process from Borealis in a plant having a prepolymerization reactor, one loop reactor and two gas phase reactors connected in series.

The monomodal propylene homopolymer matrix was produced in the loop and the first gas phase reactor; the disperse phase consisting of an ethylene-propylene rubber was produced in the second gas phase reactors.

The catalyst used in the polymerization was a vinylcyclohexyl modified Ziegler-Natta catalyst prepared according to Example 1 pf WO 99/24479 with DOP as dialkylphthalat of the formula (I) and ethanol as alcohol, the cocatalyst was Triethylaluminium (TEA) and as an external donor dicyclopentyl dimethoxy silane was used.

The ethylene-propylene rubber produced was a unimodal rubber.

Analytics of Base TPO VII)

| | |
|---|---|
| $C_2$ total [wt %] | 8.4 |
| XS [wt %] | 15 |
| $C_2$/XS [wt %] | 38.1 |
| IV/XS [dl/g] | 3.7 |
| $MFR_2$ 230° C./2.16 kg [g/10 min] | 20 |

To see the influence of the filler content the following TPO compounds were made:

TPO Compounds X1-X3

Mechanical blends of base TPO VII), with talc (Tital 15, Incemin) and 5 wt % of Engage 8100 were prepared with a twin screw extruder ZSK40 from Werner & Pfleiderer.

X1: 95 wt % base TPO VII+0 wt % talc+5 wt % Engage 8100

X2: 75 wt % base TPO VII+20 wt % talc+5 wt % Engage 8100

X3: 65 wt % base TPO VII+30 wt % talc+5 wt % Engage 8100

The blend (X1) of 95 wt % of TPO VII) and 5 wt % of Engage 8100 had an intrinsic viscosity of the disperse phase of 3.8 dl/g TPO compounds Y1-Y3

Mechanical blends of base TPO I), talc (Tital 15) and 4 wt % of Engage 8100 were prepared with a twin screw extruder ZSK40 from Werner & Pfleiderer.

Y1: 96 wt % base TPO I+0 wt % talc+4 wt % Engage 8100
Y2: 76 wt % base TPO I+20 wt % talc+4 wt % Engage 8100
Y3: 65 wt % base TPO I+30 wt % talc+4 wt % Engage 8100

The blend (Y1) of 96 wt % of TPO I) and 4 wt % of Engage 8100 had an intrinsic viscosity of the disperse phase of 2.2 dl/g Sample Preparation for Flame Treatment:

The following conditions for the injection moulding of test panels (80 mm×150 mm×2 mm) were used: melt temperature=240° C., mould temperature=50° C., and melt flow=16 cm³/s. The test panels were first purified in a simulated power wash process (pH 10, 30 bar, 30° C.). After being washed with desalinated water the panels were dried at room temperature.

A burner by Herbert Arnold GmbH (Arnold Co., Germany), with propane as the burner gas was used for the activation of the panel surface. A propane/air ratio of 25 was adjusted for the flame pretreatment. The panels were pulled ahead on a skid with 0.15 m/s and a distance from the flame of 6 cm.

The steps of power wash and flame pre-treatment were performed according to a standard laboratory process according Borealis QM work instructions (QMAA 3-430-00, available from Borealis).

The produced plaques are judged visually by a tester in terms of surface quality:

Base TPOs I, II and III were compared among each other.
Base TPOs IV, V and VI were compared among each other.

TPO compounds X1, X2 and X3 were compared among each other

TPO compounds Y1, Y2 and Y3 were compared among each other.

The results can be seen in Table 1, 2, 3 and 4

The higher the number of "+", the better was the surface quality

TABLE 1

Surface quality level for base TPOs I, II and III

| Examples | surface quality after flaming |
|---|---|
| I | + |
| II | ++ |
| III | +++ |

TABLE 2

Surface quality level for base TPOs IV, V and VI

| Examples | surface quality after flaming |
|---|---|
| IV | +++ |
| V | ++ |
| VI | + |

Table 1 and 2 clearly show that the higher the IV of the disperse phase, the better the surface quality after flame treatment was.

TABLE 3

Surface quality level for TPO compounds X1, X2 and X3

| Examples | surface quality after flaming |
|---|---|
| X1 | +++ |
| X2 | ++++ |
| X3 | +++++ |

TABLE 4

Surface quality level for TPO compounds Y1, Y2 and Y3

| Examples | surface quality after flaming |
|---|---|
| Y1 | ++ |
| Y2 | +++ |
| Y3 | ++++ |

Table 3 and 4 clearly show that an increase in the filler content leads to an improvement in the surface quality and that furthermore the combination with higher intrinsic viscosity of the disperse phase brings an additional benefit for the surface quality.

These results correlate with the results of heat respectively thermal conductivity (TC) measurements, where an increase in the filler contents leads to an increase of the TC. The fillers transfer the heat away from the surface, whereby the protection of the surface is improved and the flaming sensitivity is decreased.

Thermal Conductivity $\lambda$[W/mK]:

| | TPOs | | | | | | | | |
|---|---|---|---|---|---|---|---|---|---|
| | X1 | X2 | X3 | Y1 | Y2 | Y3 | TPO I | TPO II | TPO III |
| 130° C. | 0.206 | 0.250 | 0.251 | 0.232 | 0.230 | 0.230 | 0.212 | 0.209 | 0.217 |
| 200° C. | 0.181 | 0.216 | 0.229 | 0.182 | 0.204 | 0.210 | 0.184 | 0.182 | 0.183 |

We claim:

1. Thermoplastic polyolefin compounds for the production of injection moulded, paintable and flame pre-treatable articles comprising
   A) 50 wt % to 90 wt %, based on the total amount of thermoplastic polyolefins, of a propylene homo- or copolymer matrix phase (M), and
   B) 10 wt % to 50 wt %, based on the total amount of thermoplastic polyolefins, of a first elastomer comprising an ethylene-$C_3$-$C_8$-alpha olefin copolymer rubber,
   C) 2 wt % to 10 wt %, based on the total weight of A and B, of a second elastomer, which is an ethylene-1-octene copolymer rubber, component B) and C) forming a disperse phase (E) with an intrinsic viscosity of $\geq 2.2$ dl/g according to ISO 1628 (with decalin as solvent), and
   D) 10 wt % to 30 wt % based on the total weight of components A, B and C of an inorganic filler which in combination with the intrinsic viscosity is effective for increased thermal conductivity effective to provide decreased flaming sensitivity or no flaming sensitivity during flame pre-treatment of the article prior to painting,
   wherein a $MFR_2$ of the matrix phase (M) is 40 to 200 g/10 min (measured under a load of 2.16 kg at 230° C. according to ISO 1133),
   wherein the component C) is different from component B).

2. Thermoplastic polyolefin compounds according to claim 1, wherein the matrix phase (M) is a propylene homopolymer.

3. Thermoplastic polyolefin compounds according to claim 1, wherein the ethylene-$C_3$-$C_8$-alpha olefin copolymer rubber B) is an ethylene-propylene or ethylene-1-octene copolymer rubber.

4. Thermoplastic polyolefin compounds according to claim 1, wherein the elastomer (C) comprises ethylene and up to 45 wt % of 1-octene.

5. Thermoplastic polyolefin compounds according to claim 1, wherein the inorganic filler is selected from the group consisting of talc, wollastonite, mica and chalk and has a mean particle size d50 between 0.5 to 40 μm.

6. Thermoplastic polyolefin compounds according to claim 5, wherein the inorganic filler is talc having a mean particle size d50 between 0.7 to 20 μm.

7. Thermoplastic polyolefin compounds according to claim 1, wherein the thermoplastic polyolefin compounds have an intrinsic viscosity of the disperse phase (E) $\geq 2.5$ dl/g.

8. Thermoplastic polyolefin compounds according to claim 1, wherein the thermoplastic polyolefin compounds contain as an additional polymer a high melt flow rate polypropylene homopolymer with an MFR above 50 g/10 min according to ISO 1 133 (2.16 kg; 230 C) in an amount up to 30 wt %, based on the total weight of components A, B and C.

9. Thermoplastic polyolefin compounds according to claim 1, wherein the thermoplastic polyolefin compounds form injection moulded, paintable and flame pre-treatable articles.

10. Process for making injection moulded, paintable and flame pre-treatable articles comprising
   providing thermoplastic polyolefin compounds comprising
      A) 50 wt % to 90 wt %, based on the total amount of thermoplastic polyolefins, of a propylene homo- or copolymer matrix phase (M), and
      B) 10 wt % to 50 wt %, based on the total amount of thermoplastic polyolefins, of a first elastomer comprising an ethylene-$C_3$-$C_8$-alpha olefin copolymer rubber,
      C) 2 wt % to 10 wt %, based on the total weight of A and B, of a second elastomer, which is an ethylene-1-octene copolymer rubber, component B) and C) forming a disperse phase (E) with an intrinsic viscosity of $\geq 2.2$ dl/g according to ISO 1628 (with decalin as solvent), and
      D) greater than 10 wt % up to 30 wt % based on the total weight of components A, B and C of an inorganic filler which in combination with the intrinsic viscosity is effective for increased thermal conductivity effective to provide decreased flaming sensitivity or no flaming sensitivity during flame pre-treatment of the article prior to painting,
      wherein a $MFR_2$ of the matrix phase (M) is 40 to 200 g/10 min (measured under a load of 2.16 kg at 230° C. according to ISO 1133),
      wherein the component C) is different from component B);
   producing said injection moulded articles using said thermoplastic polyolefin compounds.

* * * * *

UNITED STATES PATENT AND TRADEMARK OFFICE
CERTIFICATE OF CORRECTION

PATENT NO. : 8,846,805 B2  
APPLICATION NO. : 13/138970  
DATED : September 30, 2014  
INVENTOR(S) : Claudia Kniesel et al.

Page 1 of 1

It is certified that error appears in the above-identified patent and that said Letters Patent is hereby corrected as shown below:

Title page,  
Item [57], Abstract, "ethylene-$C_3$-$C_6$-alpha olefin" should be --ethylene-$C_3$-$C_8$-alpha olefin--

In the Specification,

Column 2,  
Line 23, "0 wt % to $\geq$30 wt %" should be --0 wt % to $\leq$30 wt %--.

Column 5,  
Line 7, "0 wt % to $\geq$30 wt %" should be --0 wt % to $\leq$30 wt %--.

Column 10,  
Line 64, "Base TPO G)" should be --Base TPO VII)--.

Signed and Sealed this  
Fifteenth Day of December, 2015

Michelle K. Lee  
*Director of the United States Patent and Trademark Office*